United States Patent [19]
Sander

[11] 3,917,237
[45] Nov. 4, 1975

[54] METHOD AND APPARATUS FOR CONTROLLING CONTINUOUS THROUGH-PUT OF MATERIAL ON MIXING ROLLS OF A MILL

[75] Inventor: Gottfried Sander, Richterich, Germany

[73] Assignee: Hermann Berstorff Maschinenbau GmbH, Hannover-Kleefeld, Germany

[22] Filed: Dec. 10, 1973

[21] Appl. No.: 423,481

[30] Foreign Application Priority Data
Dec. 11, 1972 Germany............................ 2260565

[52] U.S. Cl................................. 259/188; 259/189
[51] Int. Cl.² ............................................ A21C 1/08
[58] Field of Search ............ 259/188, 187, 189, 190

[56] References Cited
UNITED STATES PATENTS
| | | | |
|---|---|---|---|
| 1,812,538 | 6/1931 | Lockert et al. | 259/188 |
| 2,127,076 | 8/1938 | Wagner et al. | 259/188 |
| 3,083,404 | 4/1963 | Lund | 259/187 |

FOREIGN PATENTS OR APPLICATIONS
665,680  10/1938  Germany

Primary Examiner—Harvey C. Hornsby
Assistant Examiner—Donald B. Massenberg
Attorney, Agent, or Firm—Donald D. Jeffery

[57] ABSTRACT

A method and apparatus for stripping the entire sheet of material or a portion thereof from a sheet-carrying roll of mixing rolls of a mill and passing it to a store of variable size, thereby to control the size of a knead of material provided in a gap between the mixing rolls to cause the material of the knead to pass through the gap between the rolls instead of dwelling for an undesirable long time in the knead. The store is preferably a store roller over which the sheet of material is looped and the store roller is movable towards and away from the mixing rolls to vary the length of the loop of the sheet of material passing thereover, thereby to control the rate of feed of material of the loop back to the gap between the rolls.

3 Claims, 5 Drawing Figures

METHOD AND APPARATUS FOR CONTROLLING CONTINUOUS THROUGH-PUT OF MATERIAL ON MIXING ROLLS OF A MILL

The invention relates to a method and apparatus for controlling continuous through-put of material on mixing rolls of a mill.

The mode of operation previously proposed for mixing rolls is highly unsatisfactory from the point of view of process technique, whether fresh material is fed to the rolls in batches or whether the material passes through continuously, for example feeding the mixing rolls from a preplasticising unit and feeding the output of the mixing rolls to a calender.

Thus, while a certain supply of material, a knead, is required in the gap between the mixing rolls of the mill, in order to achieve a buffering effect and to compensate for fluctuations in volume of a preplasticising unit and for disturbances of short duration, if the knead is too large the greater part of the knead does not participate in the circulation of material in the mill. Instead, a rolled sheet, as a skin on one of the rolls, passes under the knead to a greater or lesser extent depending on the viscosity of the material and its adhesion to said one of the rolls.

As the material is worked, by compressive and shearing forces, only when it passes through the gap between the rolls, the material in the knead is worked unevenly and the sheet leaving the roll is thus non-homogeneous and consists of portions of material which have been worked to varying degrees. Where the material passes continuously through the mill from one side to the other, the material in the knead may, if it remains in the knead too long, be damaged by heat, causing decomposition, cross-linking or vulcanisation owing to the long dwell time at high temperature.

When there is manual operation, the material in the knead can be brought back into the circulation of material through the gap only by incising or severing the sheet and winding it into a coil. This material is then not immediately conveyed back to the gap, and material from the knead will be drawn into the gap in its place.

After this the coiled sheet is fed back into the gap. The relatively thick coil is not drawn in evenly across the whole width, and it takes some time to obtain an even flow of material and even sheet formation right across the width of the roll mill.

It is true that there has been one exchange of material between the sheet and the knead. Afterwards, however, there is still a certain amount of material in the knead which does not participate in the exchange of material on the roll. In order to obtain a renewed interchange of material between the sheet and the knead, the sheet must again be manually severed and coiled up.

The invention has among its objects to provide for a continuous interchange of material between sheet and knead.

According to one aspect of the invention, there is provided a method for controlling continuous through-put of material on mixing rolls of a mill, in which an entire sheet of the material or a portion of such sheet of material is freed from a sheet-carrying roll of the rolls of the mill and fed back to the gap between the rolls through a material store of continuously variable capacity, in such a way that when a knead of material, in the gap between the rolls, becomes smaller than desired, more material per unit of time is fed to the gap, and when the knead becomes larger than desired, less material per unit of time is fed to the gap.

According to another aspect of the invention, there is provided apparatus for controlling continuous through-put of material on mixing rolls of a mill comprising a material store in the form of a store roll, steplessly adjustable in height above the rolls of the mill, to receive an entire sheet of the material or a portion of such sheet of material freed from a sheet-carrying roll of the rolls of the mill and to feed such sheet or portions of sheet back to the gap between the rolls and means to control the height of the store roll above the rolls of the mill such that when a knead of material, in the gap between the rolls, becomes smaller than a desired size, the store roll is moved towards the rolls of the mill so that more material per unit of time is fed to the gap, and when the knead becomes larger than a desired size, the store roll is moved away from the rolls of the mill so that less material per unit of time is fed to the gap.

Preferably, movement of the store roll towards and away from the rolls of the mill is controlled by sensing means sensing the size of the knead in the gap between the rolls. Thus, the sensing means may comprise at least one ultrasonic or infra-red device to sense the level of the knead and, in accordance with such level, to transmit pulses to a control device which acts on an adjusting motor of an adjusting mechanism, such mechanism including rotating spindles which act on the shaft of the store roll and steplessly adjust the spacing of the store roll from the rolls of the mill.

The store roll may be arranged above the mill and may cooperate with a stripper which releases the sheet from the store roll, the store roll itself preferably being coated with a non-adhesive and/or non-clinging material.

If the distance between the store roll and the roll of the mill carrying the sheet is increased, the amount of material in the loop of sheet will be increased and the rate at which material in the form of returning sheet fed to the gap will be reduced. The knead will therefore become smaller.

If the distance between the store roll and the roll carrying the sheet is subsequently reduced, material will run back into the gap from the loop of sheet at an increased rate and the amount of knead lying there will again increase.

In this way there is a continuous exchange of material between the knead and the sheet, and all the material in the gap can be worked uniformly, without any dependence on operators and without the material accumulating in large coils as it does with the manual operation described above. An important factor with the invention is that the method and apparatus can operate continuously and can be independent of any intervention by an operator.

The method of the invention can naturally be applied to either discontinuous or continuous charging and removal from the mill.

The invention is diagrammatically illustrated by way of example in the accompanying drawings, in which.

Figure 1:
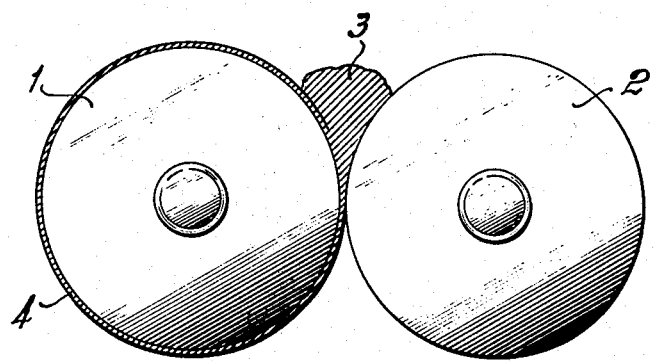
FIG. 1 is a side elevation of a roll mill of previously proposed kind.
Figure 2:
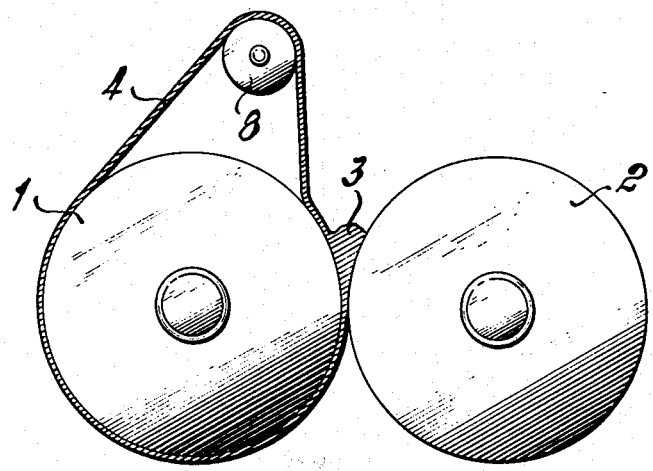
FIG. 2 is a side elevation of one embodiment of a roll mill according to the invention.
Figure 3:
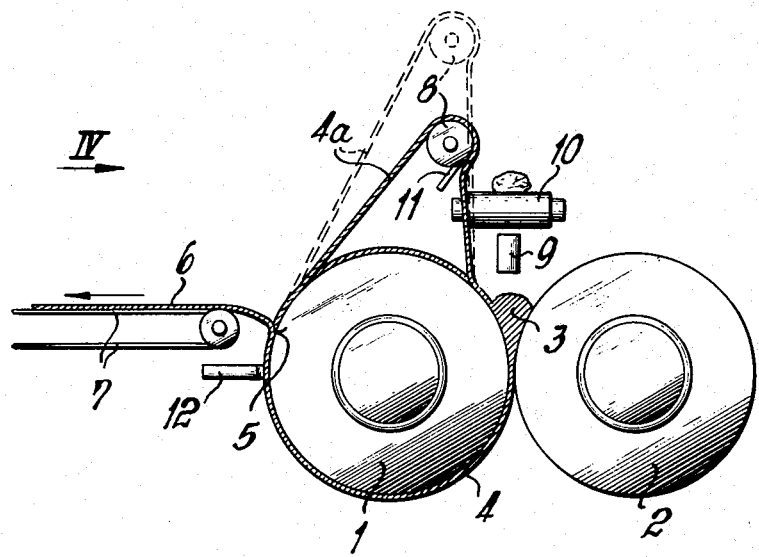
FIG. 3 is a view similar to FIG. 2 but with added details.
Figure 4:
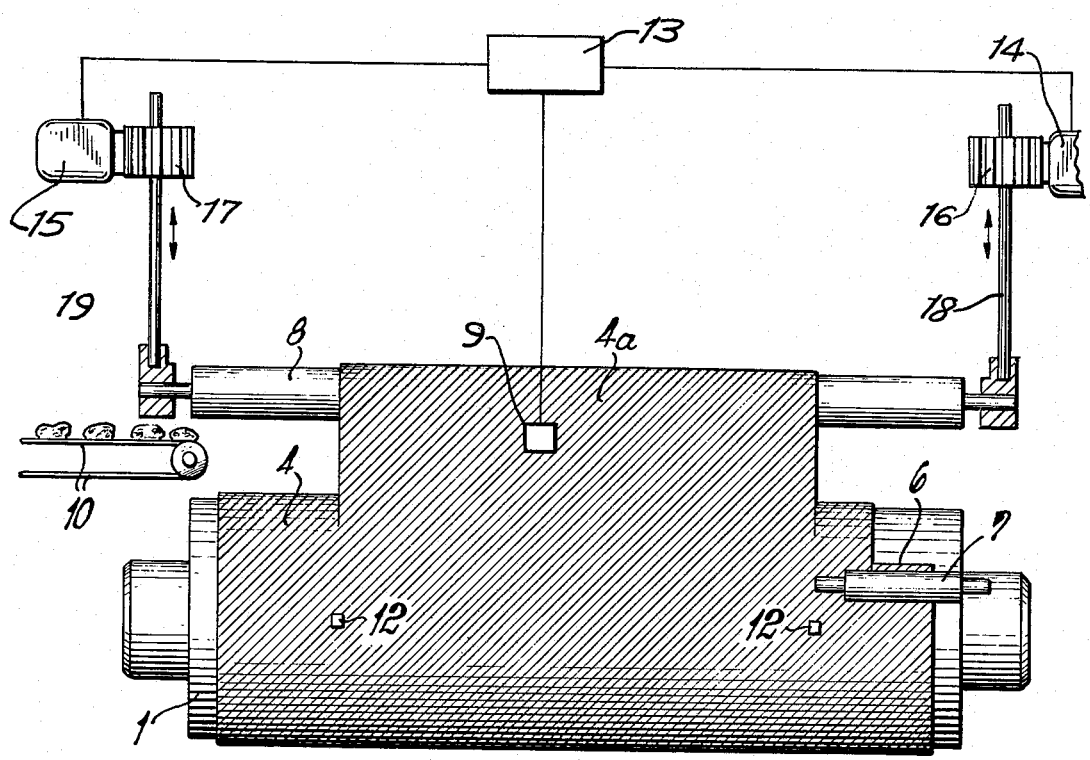
FIG. 4 is a view taken in the direction of arrow IV of FIG. 3.
Figure 5:
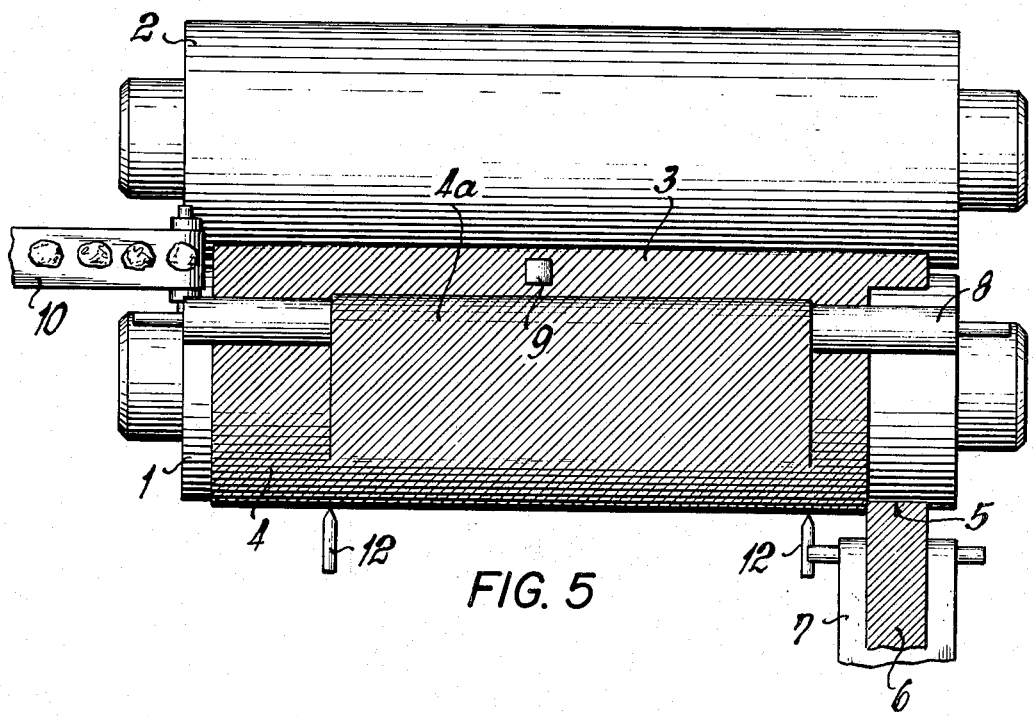
FIG. 5 is a plan view of the apparatus of FIG. 3.

Referring to FIG. 1, a mill comprises two mixing rolls 1 and 2, the roll 1 being driven at a higher rotary speed than the roll 2. Between the two rolls 1, 2 lies a knead 3 of material. In conventional mixing rolls and for continuous operation, the knead is formed by feeding material to one end of the rolls by a conveyor belt (not shown in FIG. 1 but illustrated by the conveyor belt 10 in FIG. 4). On the more rapidly rotating roll 1, a skin in the form of a sheet 4 forms, from which sheet 4, in the manner shown in FIG. 3, a strip of material 6 can be severed at 5 by a cutter and fed by a conveyor belt 7 to a calender (not shown) for processing.

Referring to FIGS. 2 to 5, in the form of the invention shown, the mixing rolls 1 and 2 are provided with means for accumulating a store of material in the form of a store roll 8 which can be driven. The spacing of the store roll 8 relative to the knead 3, that is to say its height thereabove is steplessly variable. The variation in level between the store roll 8 and the knead 3 depends on the amount of knead 3 in the gap between the rolls 1 and 2.

An ultrasonic or infra-red device 9, is provided to sense the level of the knead 3. If the height of the knead 3 exceeds a predetermined height, the device 9 transmits a pulse via a control 13 to motors 14 and 15, which in turn act on rotatable spindles 16 and 17, respectively, by way of gearing (not shown), and the spindles act on the shaft of the store roll 8 through control rods 18 and 19 to adjust the store roll 8 in height in accordance with the pulse transmitted by the device 9.

The store roll 8 should desirably be associated with a stripper 11 (FIG. 3) to release, from the store roll 8, a part 4a of the sheet 4 guided over the store roll 8. The store roll 8 is advantageously coated or covered with a non-adhesive or non-clinging material.

The apparatus of FIGS. 2 to 5 operates as follows:

As in the previously proposed apparatus of FIG. 1, material is fed at one end into the gap between the rolls 1, 2 and, forming the knead 3, moves to the opposite end of the rolls, where it is cut at 5 by a cutting means not illustrated and is supplied, as a strip of material 6, by the conveyor 7 to a calender (not shown).

The part 4a of the sheet 4 is freed from the roll 1 by cutters 12 and hung over the store roll 8.

The part 4a between of the sheet is thereafter inserted into the gap betwen the rolls 1, 2 not directly but indirectly via the store roll 8. The device 9 senses the level of the knead 3. The device 9 is equipped with a minimum contact and a maximum contact, which are set to a given minimum and maximum knead level in accordance with the prevailing production conditions.

Thus, if the size of the knead 3 in the gap between the rolls 1, 2 increases, the maximum contact on the device 9 is reached and the above described level-sensing and control means function to raise the store roll 8 to increase the spacing between it and the gap between the rolls 1 and 2. The result is that less material is inserted in the gap per unit of time, since with the larger spacing the portion 4a of the sheet 4 has to go along a longer path to the gap.

As less material from the sheet is being supplied to the gap per unit of time, the gap can instead work material from the knead itself, and this material participates in the circulation round the mill. The knead in the gap becomes continuously smaller until the minimum contact on the device 9 is reached. Then the direction of movement of the store roll 8 is changed. and the store roll 8 continuously approaches the sheet-forming roll 1 of the mill. Consequently more material from the sheet is fed to the gap per unit of time.

Thus, it is a simple matter to make continuous provision for a constant, continuous interchange of material between the knead 3 and the sheet 4, and to ensure that all the material removed from the outside of the mixing roll 1 will be uniformly worked in the gap during its passage through the mill. Another important point is that with this method and apparatus one can dispense altogether with the intervention of operating personnel.

What is claimed is:

1. Apparatus for controlling continuous through-put of material on mixing rolls of a mill comprising a material store in the form of a store roll, steplessly adjustable in height above the rolls of the mill, to receive at least a portion of a sheet of material freed from a sheet-carrying roll of the rolls of the mill and to feed it back to the gap between the rolls, sensing means for sensing the size of a knead of material in the gap between the rolls, said sensing means comprising an ultrasonic device to sense the level of the knead and, in accorance with such level, to transmit pulses to a control device which acts on an adjusting motor of an adjusting mechanism, such mechanism including rotating spindles which act on the shaft of the store roll and steplessly adjust the spacing of the store roll from the rolls of the mill such that when a knead of material in the gap between the rolls becomes smaller than a desired size the store roll is moved towards the rolls of the mill so that more material per unit of time is fed to the gap, and when the knead becomes larger than a desired size the store roll is moved away from the rolls of the mill so that less material per unit of time is fed to the gap.

2. Apparatus for controlling continuous through-put of material on mixing rolls of a mill comprising a material store in the form of a store roll, steplessly adjustable in height above the rolls of the mill, to receive at least a portion of a sheet of material freed from a sheet-carrying roll of the rolls of the mill and to feed it back to the gap between the rolls, sensing means for sensing the size of a knead of material in the gap between the rolls, said sensing means comprising an infra-red device to sense the level of the knead and, in accordance with such level, to transmit pulses to a control device which acts on an adjusting motor of an adjusting mechanism, such mechanism including rotating spindles which act on the shaft of the store roll and steplessly adjust the spacing of the store roll from the rolls of the mill such that when a knead of material in the gap between the rolls becomes smaller than a desired size the store roll is moved towards the rolls of the mill so that more material per unit of time is fed to the gap, and when the knead becomes larger than a desired size the store roll is moved away from the rolls of the mill so that less material per unit of time is fed to the gap.

3. Apparatus for controlling continuous through-put material on mixing rolls of a mill comprising a material store in the form of a store roll, steplessly adjustable in height above the rolls of the mill, to receive at least a portion of a sheet of material fed from a sheet-carrying roll of the rolls of the mill and to feed it back to the gap between the rolls, sensing means for sensing the size of a knead in the gap between the rolls, and control means responsive to said sensing means for controlling the height of the store roll above the rolls of the mill such that when a knead of material in the gap between the rolls becomes smaller than a desired size as sensed by said sensing means the store roll is moved towards the rolls of the mill so that more material per unit of time is fed to the gap, and when the knead becomes larger than a desired size as sensed by said sensing means the store roll is moved away from the rolls of the mill so that less material per unit of time is fed to the gap.

* * * * *